Jan. 16, 1951  R. POLK, SR  2,538,590
CITRUS FRUIT JUICER
Filed Sept. 18, 1944  2 Sheets-Sheet 1

INVENTOR.
RALPH POLK Sr.
BY
Hood & Hahn
ATTORNEYS.

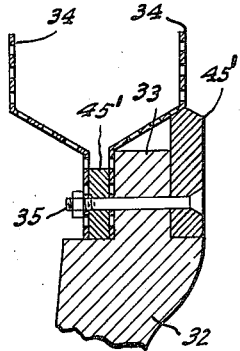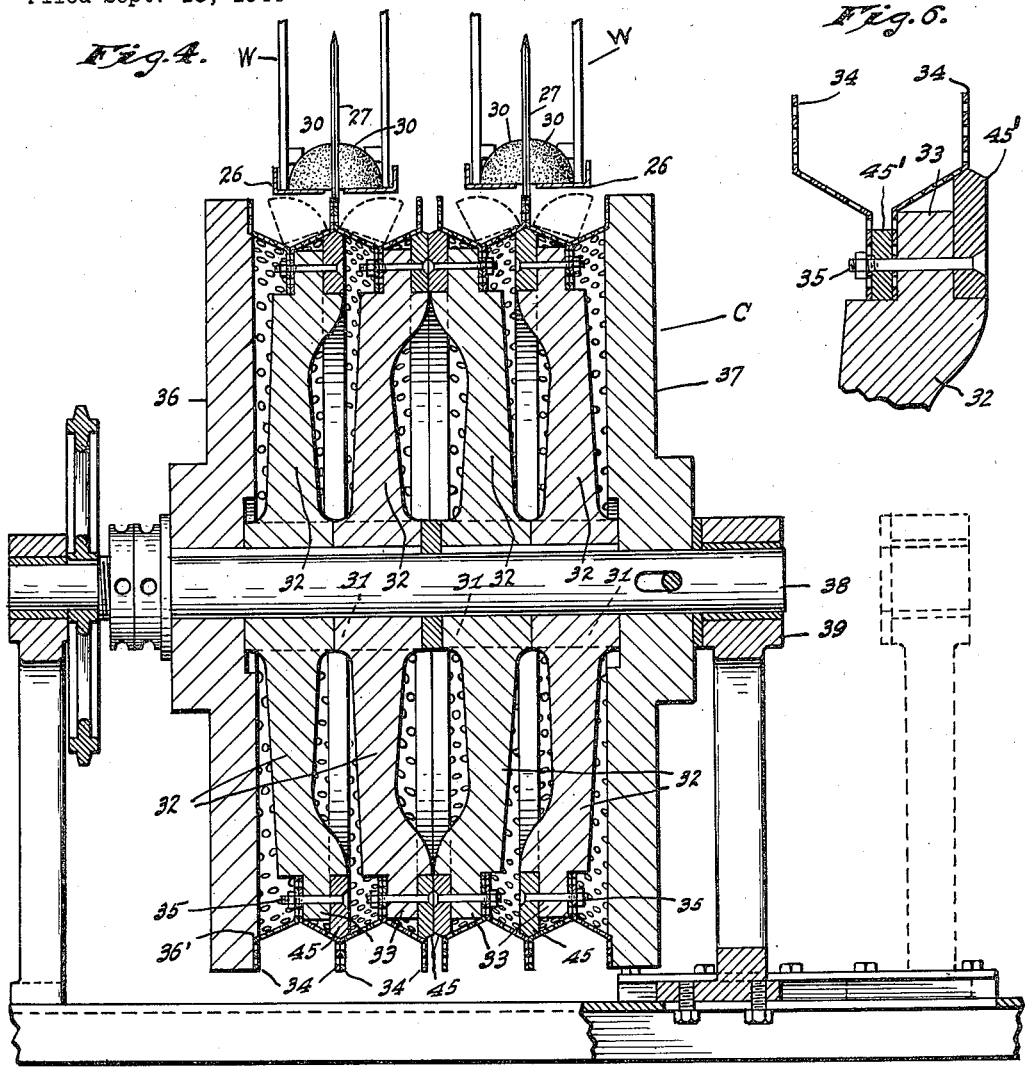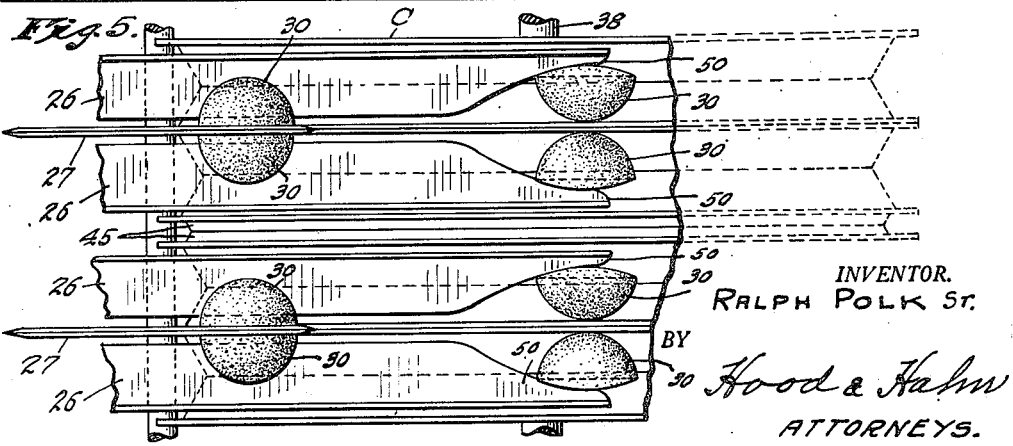

Patented Jan. 16, 1951

2,538,590

UNITED STATES PATENT OFFICE 2,538,590

CITRUS FRUIT JUICER

Ralph Polk, Sr., Tampa, Fla., assignor to The Polk Development Company (not incorporated), Tampa, Fla., a copartnership of Florida composed of Ralph Polk, Sr., and Ralph Polk, Jr.

Application September 18, 1944, Serial No. 554,650

8 Claims. (Cl. 100—47)

The object of my invention is to provide improved methods and means for extracting the juice from peel-bearing segments of citrus fruits while avoiding substantial contamination by peel-oil.

My improved apparatus is most efficient when operating upon freshly quartered fruit segments and therefore has been primarily designed for use (though not exclusively) as an adjunct of the quartering mechanism which forms part of the subject matter of Patent 2,236,916 dated April 1, 1941, the present apparatus taking the place of the juice-extracting mechanism shown in that patent.

The accompanying drawings illustrate my invention.

Fig. 4 is a diagrammatic section on line 4—4 of Fig. 1;

Fig. 5 is a fragmentary plan of the delivery end of the segmenter guide; and

Fig. 6 is a fragmentary section of a slightly modified colander.

Figure 1:
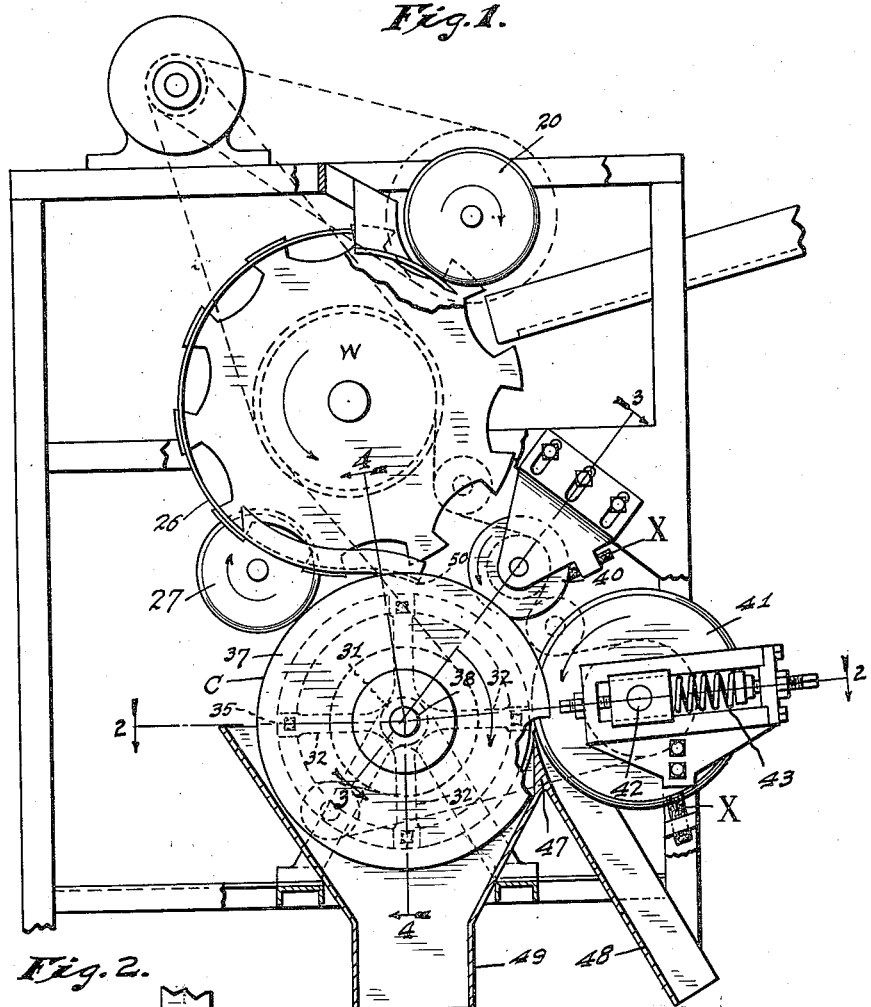
Fig. 1 is a side elevation, largely diagrammatical, of my invention.

Referring to the drawings, the fruit-forwarding wheels W, disk knives 20 and 27, guide cover 26, and immediately associate parts of the fruit segmenter are the same as shown in Patent 2,236,916.

Arranged at the delivery end of guide 26 are colander wheels C axially spaced to receive the fruit segments 30 delivered by wheels W. Each colander wheel comprises a hub 31, spokes 32, brace ring 33 and two mating colander rings 34, 34 removably attached to the spokes by bolts 35. The colander rings are conveniently made of perforated sheet metal bent to form the inner and outer radial section and an intermediate section inclined from the axis less than 45 degrees with an axial extent somewhat more than the radius of the largest fruit to be handled. Ring 33 underlies and braces the intermediate sections of the adjacent colander rings. The group of colander rings is flanked at each end by guard disks 36 and 37, disk 36 being provided with a circumferential shoulder 36' underlying the intermediate portion of the adjacent colander ring, and disk 37 being readily removable from the supporting shaft 38 and flanked by an axially movable outboard bearing 39, axial withdrawal of bearing 39 from the adjacent end of shaft 38 permits axial removal of the colander rings for ready cleaning.

Coacting with each colander ring is a preliminary presser wheel 40 the periphery of which is frusto conical and lies between the outer radial sections of the colander wheel in position to engage the peel faces of fruit-segments and start the flow of juice from the segments. The periphary of wheel 40 is spaced from the mating colander rings so that it may flatten the peel of the fruit segments without substantial rupture of the peel.

Below pressure wheel 40 is a final presser wheel 41 the periphery of which is crowned to mate with the oppositely inclined intermediate sections of the colander rings. Wheels 41 are carried by a shaft 42 which is carried by bearings yieldingly urged transversely toward the axis of the colander rings by springs 43, or otherwise, with a force sufficient to rupture the juice cells but insufficient to rupture many of the oil cells of the peels.

The colander and pressure wheels are rotated by suitable driving means at peripheral speeds at least equal to the peripheral speed of the segmenting wheels W.

The pressure exerted on the fruit segments by pressure wheel 41 is such that pulp will be driven into, but not through, the perforations of the colander rings so that the dejuiced segments tend to adhere to the colander rings. To insure removal of the dejuiced segments, I provide a spacer ring identified in the first form of the invention by the numeral 45 and in the second form of the invention by the numeral 45'. The spacers 45 and 45' are positioned between the inner radial portions of a mating pair of colander rings, the external diameter of which is such as to leave a space 46 for the reception of a stripper finger 47 projecting upwardly from the upper edge of a peel guide plate 48 leading away from the juice chute 49, one wall of which extends upwardly between plate 48 and the periphery of the colander wheels W.

When the fruit is segmented by mechanism like that shown in Patent 2,236,916, the fruit quarters lie on plate 26 and are propelled from the forward edge thereof by the pocket wheels W and, in order to deliver these fruit quarters apex down to the colander wheels, I provide the forward edge of plate 26 with forwardly extending fingers 50 which, for a short space, underlie the cut side of the segments.

In the commercial production of citrus fruit juice, especially for canning, it is desirable to avoid, as far as possible, contamination of the juice by oils contained in the skins, while at the same time extracting a maximum of juice with a minimum of pulp, all at a maximum speed and consequent minimum cost.

Half fruits may be successfully reamed while avoiding skin rupture, but considerable pulp accompanies the juice and natural variations in fruit diameters and skin thicknesses cause either juice loss or oil contamination because a middle size reamer breaks the skins of undersize fruit and misses some of the juice of oversize fruit, a reamer ideal for small fruit misses much of the juice of large fruit, and a reamer ideal for large fruit breaks the skins of small fruit.

De-juicing by pressure applied to half fruits on a flat surface or on a roller, ruptures the skins with consequent oil contamination.

I have found that if the fruit is segmentized into segments having an included angle substantially less than 180°, say not more than 120°, and preferably approximately 90°, i. e., "quarters" the skins, particularly those of oranges, may be flattened without substantial rupture of the oil cells in the skins.

For the above reasons, therefore, I have found that fairly accurate quartering of the fruit is a necessary step preliminary to juice expression by pressure and I consider it especially advantageous if this quartering be immediately followed by pressure juice extraction, the pressure being applied, as described above, simultaneously on all of the "quarters" of each fruit because, under such circumstances, no matter what the skin thickness may be, all segments of each fruit are subjected to exactly the same pressure which will be enough to attain maximum juice expression but not heavy enough to compress the skins to an oil-cell rupture point.

Figure 2:
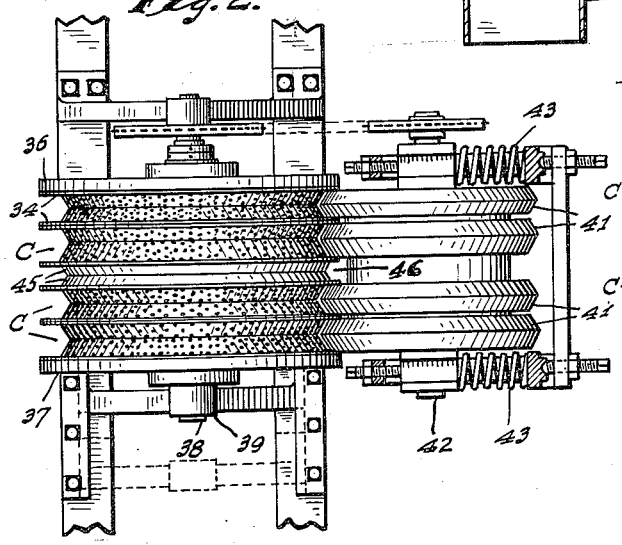
Fig. 2 is a fragmentary section on line 2—2 of Fig. 1, on a larger scale.
Figure 3:
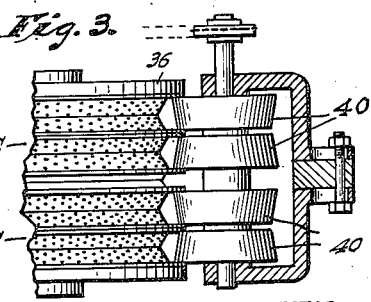
Fig. 3 is a fragmentary section on line 3—3 of Fig. 1, on the scale of Fig. 2.

It will be noted that all of the segments of each fruit as it is carried through the cycle determined by wheel W (as described in Patent 2,236,916) are discharged simultaneously and those segments, as described herein, are simultaneously delivered to the colander wheels C. All of the segments of each fruit are then simultaneously squeezed onto the colander wheel by rollers 40 which progressively flatten the skins transversely. This progressive transverse flattening avoids substantial skin rupture and is only partial because the peripheries of rollers 40 are spaced from the colander rolls a little more than maximum skin thickness. The partially distorted segments, after a short period of release of pressure as they pass from rollers 40, are then engaged by rollers 41 the progressive action of which convexes the insides of the skins transversely without substantial skin rupture and substantial oil-cell rupture is avoided by preventing the peripheries of rollers 41 to approach the peripheries of the colander rolls too closely, as indicated in Fig. 2.

I have found in actual practice that the apparatus described above acts with a very high degree of efficiency to extract the fruit juice with considerably less contamination by peel-oil than can be attained by juice extractors now commonly used for the commercial production of citrus fruit juices—particularly orange juice.

I have found by tests that, in order to reduce oil-cell rupture to a minimum, the fruit segments should not have arcuate extent of more than 90°, and that peel rupture is materially reduced if the included angle between the intermediate portions of the colander rings is somewhat greater than 90°, so that at the initiation of juice freeing pressure, the fruit segment is supported by the colander ring on one radial face only.

The initial pressure roll therefore first engages the fruit segment peel at about the middle of one edge rather than at the crown of the peel. Under these conditions, the peel is much less likely to rupture in such manner as to rupture oil cells beyond the absorptive capacity of the peel.

In order to reduce the possibility of oil contamination, wipers X are arranged to contact the peripheries of the pressure wheels.

The axis of the second pressure wheel should be a little higher than the axis of the colander wheel as this arrangement appears to avoid as much juice loss as occurs when the axis of this pressure wheel is at or below the level of the axis of the colander wheel.

The term "quartering," as used in the claims, is intended to define a segmentation producing a segment having two cut faces lying at an angle to each other, nor more than 120°, and such that the skins of the major numbers of such segments may be flattened without substantial rupture of oil cells.

I claim as my invention:

1. The method of extracting juice from citrus fruits which comprises the step of quartering the whole fruit into segments, the step of depositing all of one fruit upon a colander surface, and the step of applying pressure upon the skin surfaces of the segments toward the colander surface and progressively along the segments and in directions to reverse the transverse curvature of the skin, said pressure being sufficient to express juice and insufficient to cause substantial oil-cell rupture.

2. The method of extracting juice from citrus fruits which comprises the step of quartering the whole fruit into segments, the step of depositing all of the segments of one fruit cut faces downward upon a colander surface, and the step of applying pressure simultaneously upon all the skin surfaces of all the segments of one fruit toward the colander surface progressively along the segments and in directions to reverse the transverse curvature of the skin, said pressure being sufficient to express juice and insufficient to cause substantial oil-cell rupture.

3. A fruit juicer comprising means for segmenting a fruit into a plurality of segments each having two cut faces at an included angle not greater than 120°, a colander surface, means for simultaneously depositing all of the segments of each fruit cut faces downward on said colander surface, and means for simultaneously applying pressure upon the skin surfaces of said segments toward the colander surface sufficient to express juice and insufficient to cause substantial oil-cell rupture.

4. A fruit juicer comprising means for segmenting a fruit into a plurality of segments each having two cut faces at an included angle not greater than 120°, a rotary colander surface, means for simultaneously depositing all of the segments of each fruit cut faces downward on said colander surface, and a pressure roller co-ordinated with said colander surface to exert pressure simultaneously upon the skin surfaces of all of the segments of a given fruit toward the colander surface sufficient to express juice and insufficient to cause substantial oil-cell rupture.

5. In a fruit juicer, a rotatable colander wheel having a perforate peripheral channel formed by outwardly divergent elements at an included angle of more than 90°, and a rotatable pressure wheel having a periphery axially ridged to correspond to the included angle of said elements, a portion of the periphery of the pressure wheel being projected into the channel of the colander wheel in position to compress fruit segments passed therebetween.

6. Apparatus of the character specified in claim 5, wherein the pressure wheel is yieldingly urged toward the colander wheel under a pressure less than sufficient to cause substantial oil-cell rupture.

7. The method of extracting juice from citrus fruit which comprises the step of quartering whole fruit into segments, the step of depositing the segments on a colander surface, the step of applying preliminary pressure on the outer peel surface of the segments toward the colander surface in a direction to substantially flatten the peel of the segments, and subsequentially applying supplementary pressure on the outer peel surface of the segments in directions to reverse the transverse curvature of the peel, said pressures being sufficient to express juice and insufficient to cause substantial oil cell rupture.

8. In a fruit juicer, a colander wheel having a perforate peripheral channel formed by outwardly divergent elements at an included angle of more than 90°, a first rotatable pressure wheel having a frusto conical periphery and having a portion thereof projected into the said channel in position to partially compress fruit segments passed between same and the colander wheel, and a second pressure wheel having a periphery axially ridged to correspond to said angle of said divergent elements and having a portion projected into the channel in position to further compress partially compressed segments between the same and colander wheel.

RALPH POLK, SR.

REFERENCES CITED

The following references are of record in the file of this patent:

UNITED STATES PATENTS

| Number | Name | Date |
|---|---|---|
| 354,022 | Onderdonk | Dec. 7, 1886 |
| 670,963 | Logemann | Apr. 2, 1901 |
| 1,600,882 | Jacobson | Sept. 21, 1926 |
| 2,199,345 | Polk et al. | Apr. 30, 1940 |
| 2,212,066 | Frey | Aug. 20, 1940 |
| 2,226,513 | McKinnis | Dec. 24, 1940 |
| 2,236,916 | Polk, Sr., et al. | Apr. 1, 1941 |
| 2,240,909 | Polk et al. | May 6, 1941 |
| 2,334,783 | McKinnis | Nov. 23, 1943 |